United States Patent
Tay

(10) Patent No.: US 6,656,070 B2
(45) Date of Patent: Dec. 2, 2003

(54) CONE WITH TORQUE TRANSMITTING MEMBERS FOR CONTINUOUS VARIABLE TRANSMISSIONS

(76) Inventor: Armin Sebastian Tay, 701 Rand Ave. Apt. B, Oakland, CA (US) 94610

( * ) Notice: Subject to any disclaimer, the term of this patent is extended or adjusted under 35 U.S.C. 154(b) by 161 days.

(21) Appl. No.: 09/758,707

(22) Filed: Jan. 11, 2001

(65) Prior Publication Data

US 2002/0091026 A1 Jul. 11, 2002

Related U.S. Application Data

(63) Continuation of application No. 60/220,532, filed on Jul. 24, 2000, which is a continuation of application No. 60/252,532, filed on Nov. 21, 2000.

(51) Int. Cl.[7] ............................. F16H 9/08; F16H 9/10
(52) U.S. Cl. ................................. 474/83; 474/53
(58) Field of Search ............................. 474/83, 101, 53, 474/54, 55, 109, 174, 39, 49–52, 136

(56) References Cited

U.S. PATENT DOCUMENTS

| | | | | | |
|---|---|---|---|---|---|
| 137,352 A | * | 4/1873 | Fales | ........................... | 474/53 |
| 703,359 A | * | 6/1902 | White | ........................... | 474/83 |
| 704,203 A | * | 7/1902 | Moorhouse | .................. | 474/53 |
| 1,314,580 A | * | 9/1919 | Dunbar | ........................ | 474/53 |
| 1,379,504 A | * | 5/1921 | Young | .......................... | 474/53 |
| 2,552,179 A | * | 5/1951 | Kamp | ........................... | 474/53 |
| 4,781,656 A | * | 11/1988 | Brackett et al. | ............... | 474/39 |
| 6,126,562 A | * | 10/2000 | Brangenfeldt | ............... | 474/109 |
| 6,152,844 A | * | 11/2000 | Daugherty | .................... | 474/49 |

FOREIGN PATENT DOCUMENTS

FR 1111228 * 9/1956

* cited by examiner

Primary Examiner—Marcus Charles
(74) Attorney, Agent, or Firm—Armin Tay

(57) ABSTRACT

A cone to which one or several torque transmitting member(s) are attached as to form at least one torque transmitting arc on the surface of the cone. The torque transmitting member(s) will be used for torque transmission between at least one rotational energy conveying device and the cone. The torque transmitting member(s) are attached in a manner such that significant circumferential sliding that occurs between the torque transmitting surface(s) of the torque transmitting member(s) and the torque transmitting surface(s) of the rotational energy conveying device(s) when the pitch diameter of the torque transmitting member(s) is changed can be eliminated, such that wear and frictional energy losses are significantly reduced, and positive engagement devices, such as teeth, can be used for torque transmission between the torque transmitting member(s) and the rotational energy conveying device(s). The cone with torque transmitting member(s) can be used to construct various Continuous Variable Transmissions that have a long life, low frictional energy losses, and can be made non-friction dependent.

22 Claims, 10 Drawing Sheets

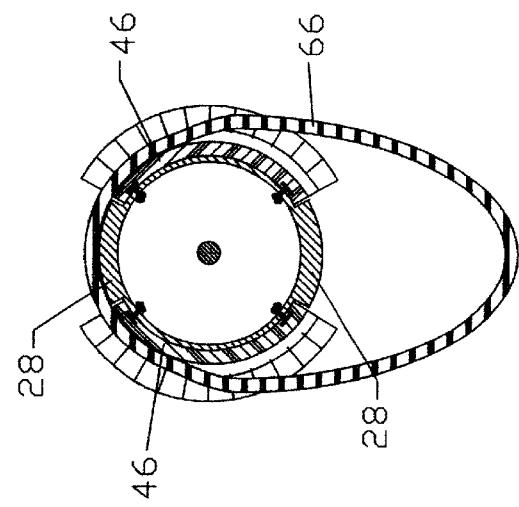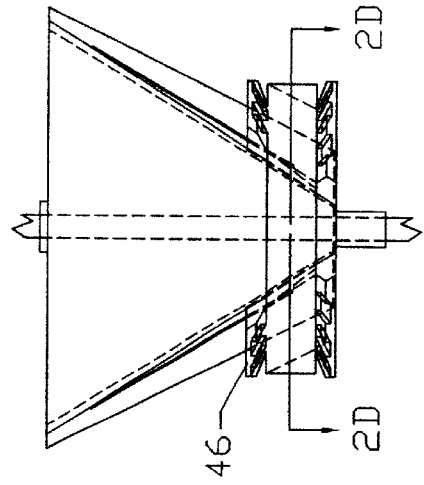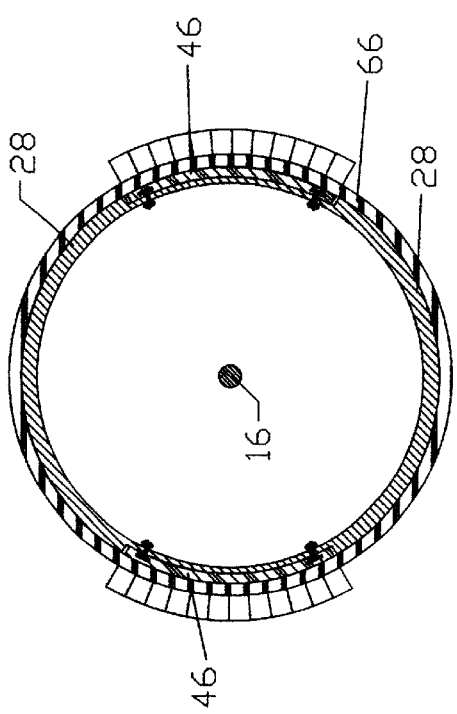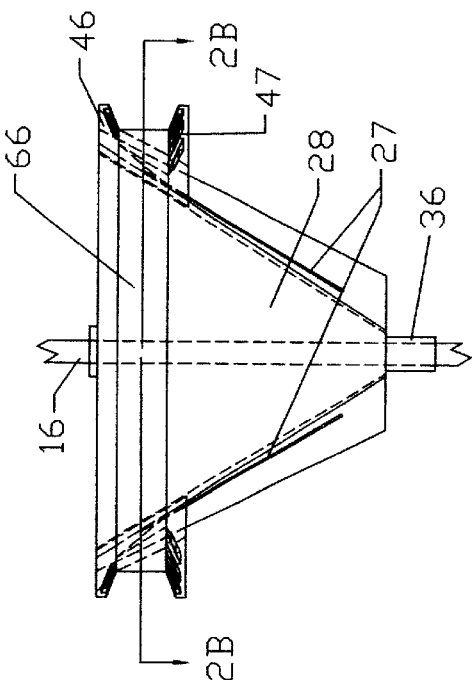

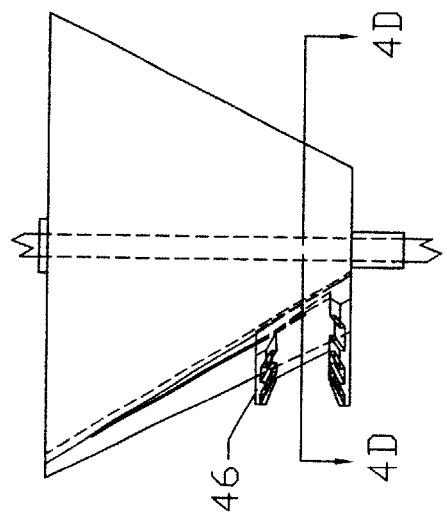
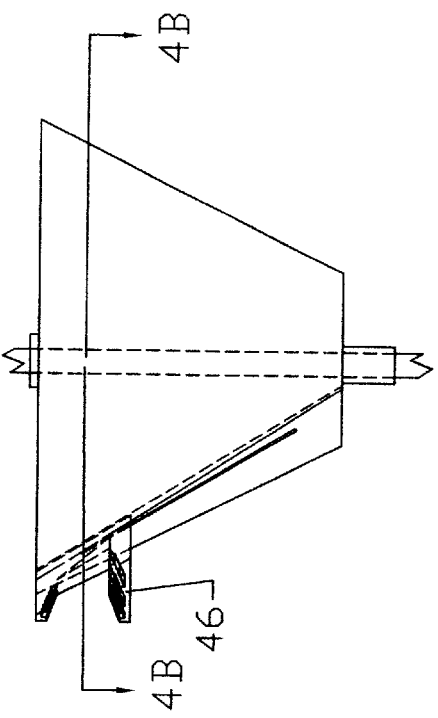
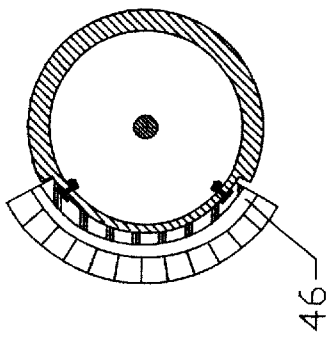
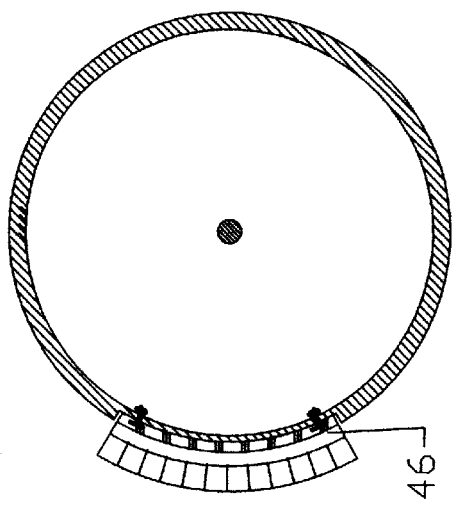

CONE WITH TORQUE TRANSMITTING MEMBERS FOR CONTINUOUS VARIABLE TRANSMISSIONS

CROSS REFERENCE TO RELATED APPLICATIONS

This invention is entitled to the benefit of Provisional Patent Application Ser. No. 60/220,532, Filed Jul. 24, 2000. Variation of this invention has been discussed in application, Ser. No. 09/637,437 abandoned May 13, 2002 and Provisional Patent Application Ser. No. 60/252,375 Filed Nov. 21, 2000.

BACKGROUND

1. Field of the Invention

This invention relates to variable torque/speed transmission, specifically to a variable transmission where the transmission ratio can be varied continuously between any two predetermined values.

2. Description of Prior Art

In most applications the transmission ratio, which is the torque vs. speed ratio transmitted by a driving source, needs to be adjustable in order for the driving source to operate efficiently and effectively. For example, for a vehicle, during start-up, assuming that it is on a level road, the driving source needs to provide torque to accelerate the vehicle and torque to overcome the resisting forces mainly due to friction and wind resistance. Once the vehicle has reached its desired speed, again assuming that it is on level road, the engine only needs to provide torque to overcome the resisting forces, which in this case is likely to be greater than during start-up, but less than the total torque needed during start-up. Hence in this case the torque that the driving source needs to provide is less than the torque that it needs to provide during start-up. However, here the driving source needs to rotate the output shaft at a higher speed since the desired speed of the vehicle is assumed to be greater than the speed of the vehicle during start-up. From the example above it can be seen that during start-up, the driving source needs to provide a relatively large torque and operate at a relatively low speed. And once the desired speed is reached, the driving source needs to provide a relatively small torque and operate at a relatively high speed. Here a relatively large torque would be wasteful. Hence in order to increase the efficiency of the driving source most vehicles have a transmission, which can vary the torque vs. speed ratio of the driving source.

Most vehicles, such as cars, bikes, or motorcycles use a discrete variable transmission. Here the operator can select between several discrete transmission ratios usually by selecting an input gear or sprocket that is coupled to an output gear or sprocket, which is selected from a set of output gears or sprockets of various pitch diameters. The main advantage of a Continuous Variable Transmission (CVT) over a discrete variable transmission is that a CVT can provide the driving source with a more efficient transmission ratio under most conditions.

One well know CVT, which principal of operation is similar with many CVTs of prior art, consists of two cones, each keyed to a separate shaft, that are coupled by a belt. Because the cones have a tapered surface, the pitch diameters of the cones, which is the diameter of the surface of the cones where the belt is axially positioned, changes as the axial position of the belt is changed. Since the apex of the cones point in the opposite direction, changing the axial position of the belt, increases the pitch diameter of one cone while decreases the pitch diameter of the other cone. This fact is used to change the transmission ratio between the shafts. One problem with this CVT is that changing the transmission ratio causes wear and frictional energy loses, since the belt has to slide and/or stretch relative to the surfaces of the cones as the pitch diameter is changed.

Another problem with the CVT mentioned in the previous paragraph is that torque can only be transmitted by friction. The need of friction limits the torque that can be transmitted, without causing unpractical high stresses in the belt and in the CVT's supporting members.

SUMMARY

In accordance with the present invention a cone assembly to which at least one torque transmitting member is attached in manner such that significant circumferential sliding between the torque transmitting surface(s) of the torque transmitting member(s) and the torque transmitting surface (s) of the rotational energy conveying device(s) engaged to it due to change in pitch diameter can be eliminated, as to reduce wear and frictional energy loses typical in similar devices of prior art and allow the usage of positive engagement devices in coupling the torque transmitting member(s) with their rotational energy conveying device(s). The cone assemblies of this invention can be used to construct various CVTs, some which are described in this application.

OBJECTS AND ADVANTAGES

Accordingly, besides the objects and advantages of the cone with torque transmitting member(s) described in my above patent, several objects and advantages of the present invention are:

(a) To provide a cone assembly that can be used to construct various CVTs.

(b) To provide several CVTs for which frictional energy loses and wear due to change in transmission ratio can be significantly reduced over many CVTs of prior art.

(c) To provide several non-friction dependent CVTs that have better efficiency than many CVTs of prior art.

(d) To increase the efficiency of machines by introducing CVTs that have sufficient torque transmission efficiency to replace discrete variable transmissions.

Still further objects and advantages will become apparent from a consideration of the ensuing description and drawings.

DRAWING FIGURES.

In the drawings, closely related figures have the same number but different alphabetic suffixes.

FIGS. 2A, 2B, 2C, and 2D are drawings of a cone with two torque transmitting members, which are placed opposite from each other. This cone assembly is labeled as cone assembly 26A.

FIGS. 3A, 3B, 3C, and 3D are drawings of a cone with one torque transmitting member and one maintaining member, which is placed opposite from the torque transmitting member. The arc length of its torque transmitting member is limited as will be discussed in the description for cone assembly 26B. This cone assembly will be referred to as cone assembly 26B. In addition, FIGS. 3A, 3B, 3C, and 3D also show a mover mechanism that will be used to move the torque transmitting members and the maintaining members relative to the surface of the cone to which they are attached in the axial direction.

FIGS. 4A, 4B, 4C, and 4D are drawings of a cone with one torque transmitting member, which arc length is limited. The arc length limitation will be discussed in the description for cone assembly 26C. This cone assembly will be referred to as cone assembly 26C.

Figures 1A, 1B:
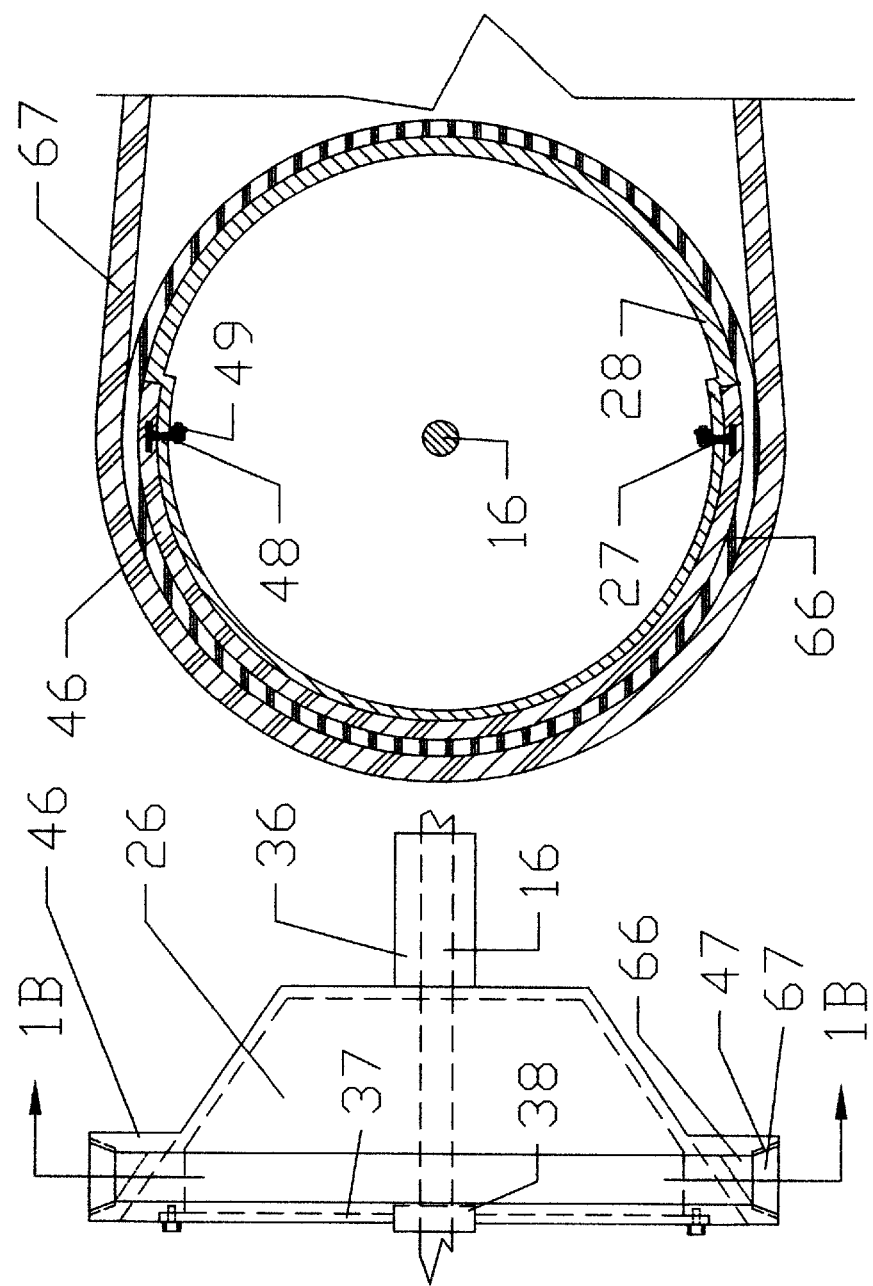
FIGS. 1A and 1B show the general configuration for the cone with torque transmitting member(s), where a torque transmitting member is positioned at the larger end of its cone. This cone assembly is labeled as cone assembly 26.
Figures 1C, 1D:
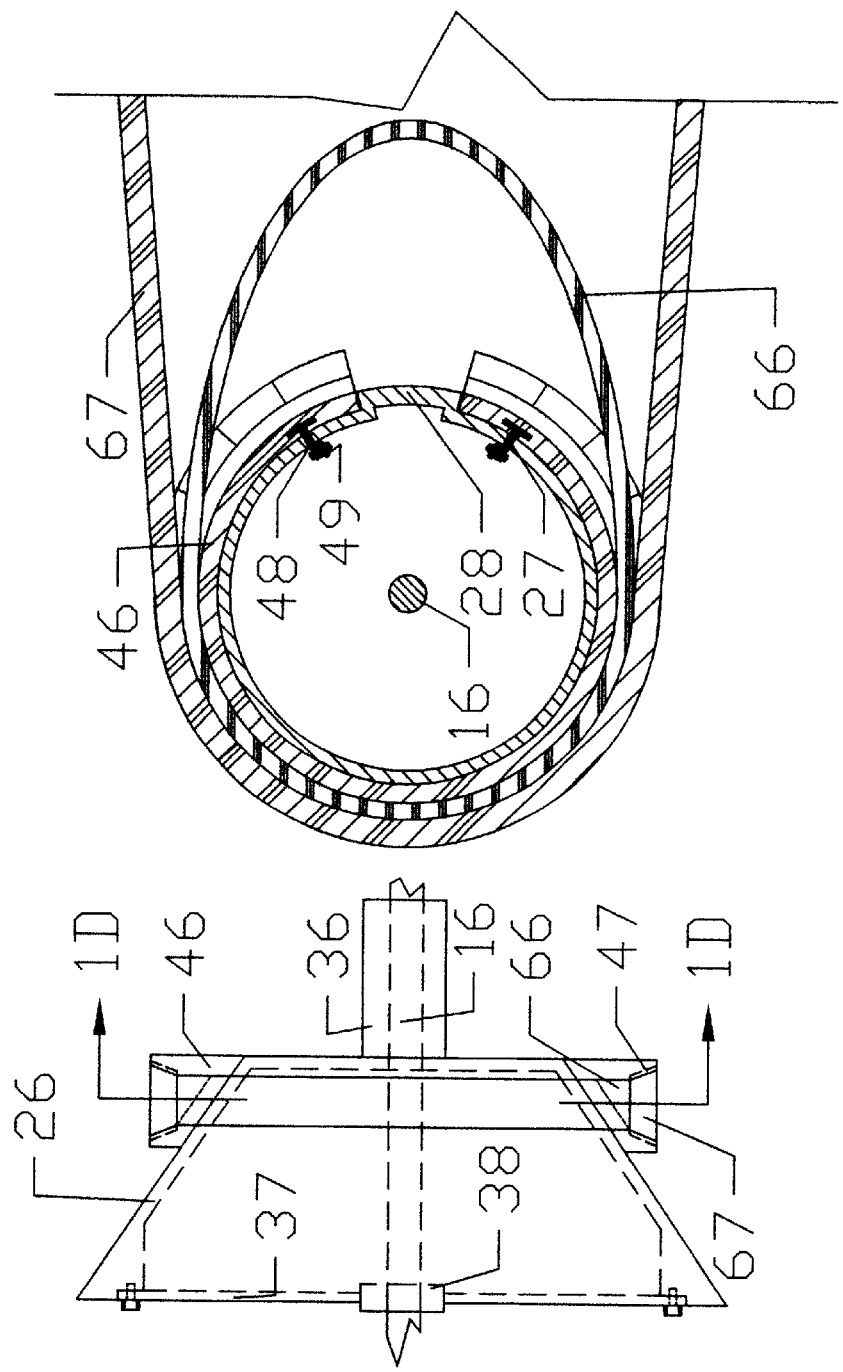
FIGS. 1C and 1D show the general configuration for the cone with torque transmitting member(s), where a torque transmitting member is positioned at the smaller end of its cone. This is another drawing of cone assembly 26.
Figure 3D:
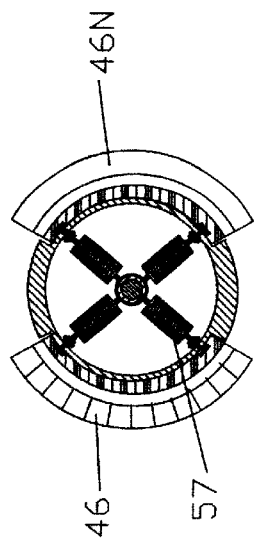
Figure 3C:
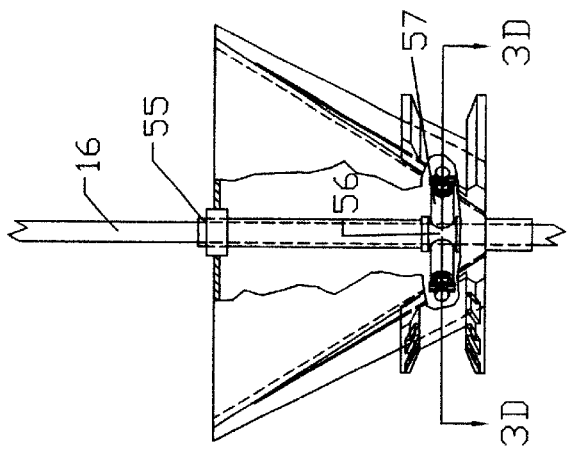
Figure 3B:
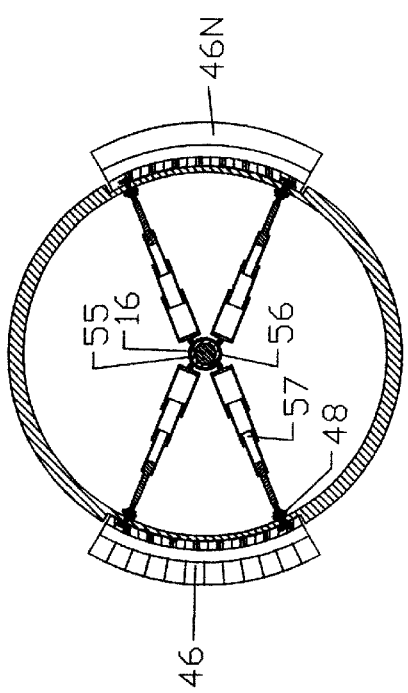
Figure 3A:
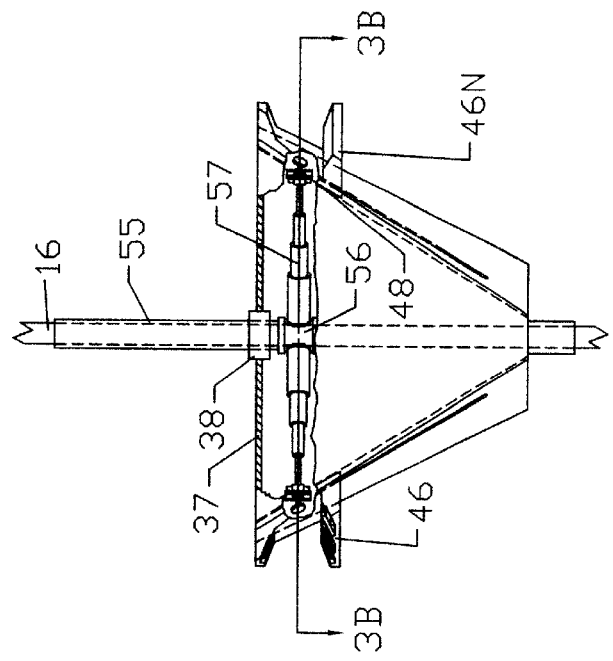
Figure 5B:
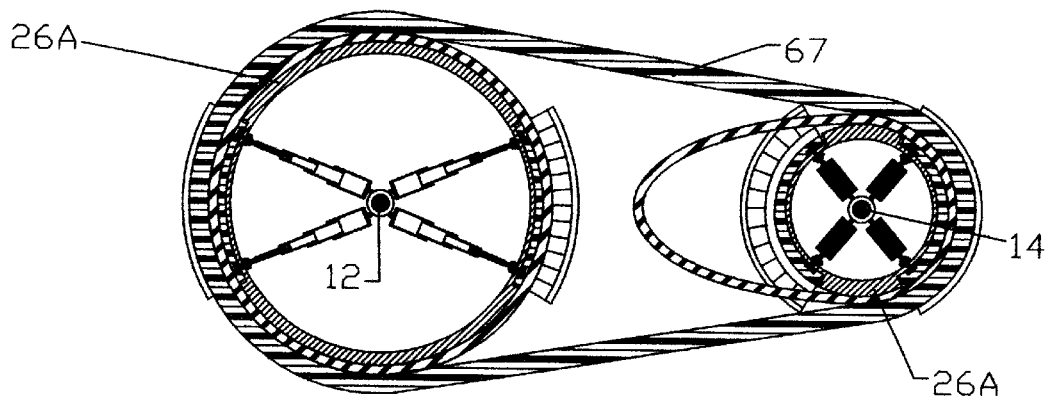
Figure 5A:
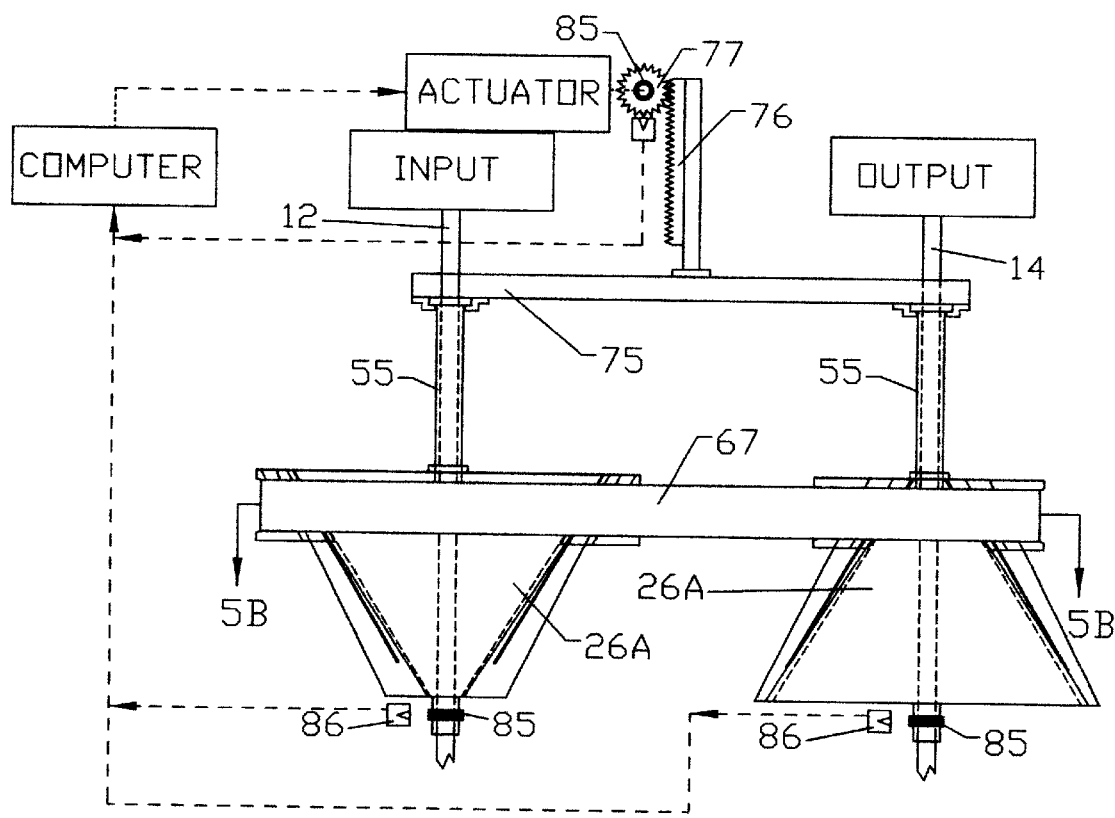

FIGS. 5A and 5B shows a CVT that uses two cone assemblies 26A. This CVT will be labeled as CVT1.

Figure 6A:
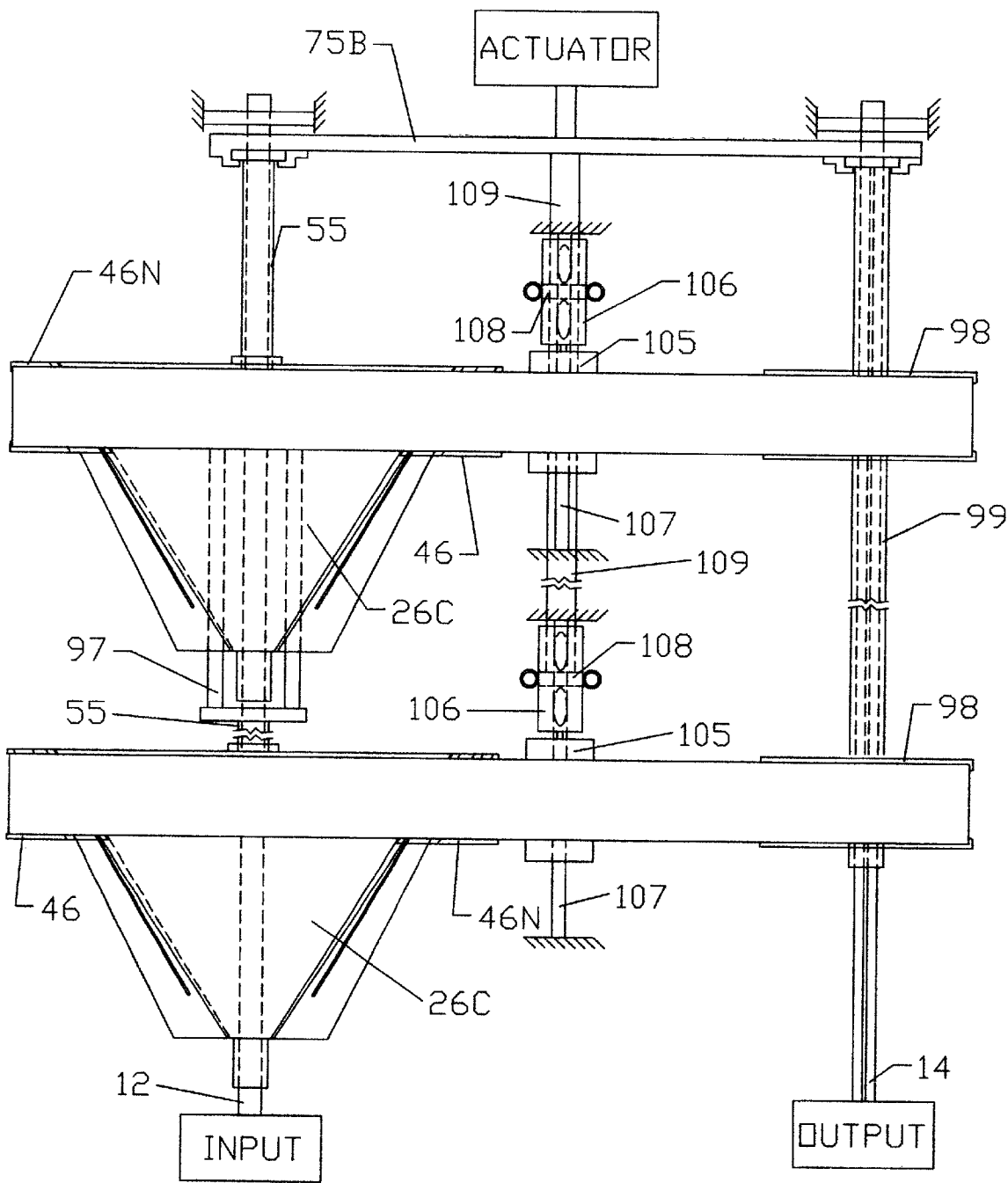

FIG. 6A is a top-view of a CVT that uses two cone assemblies 26B, which are coupled to two transmission pulleys. This CVT will be labeled as CVT2.

Figure 6B:
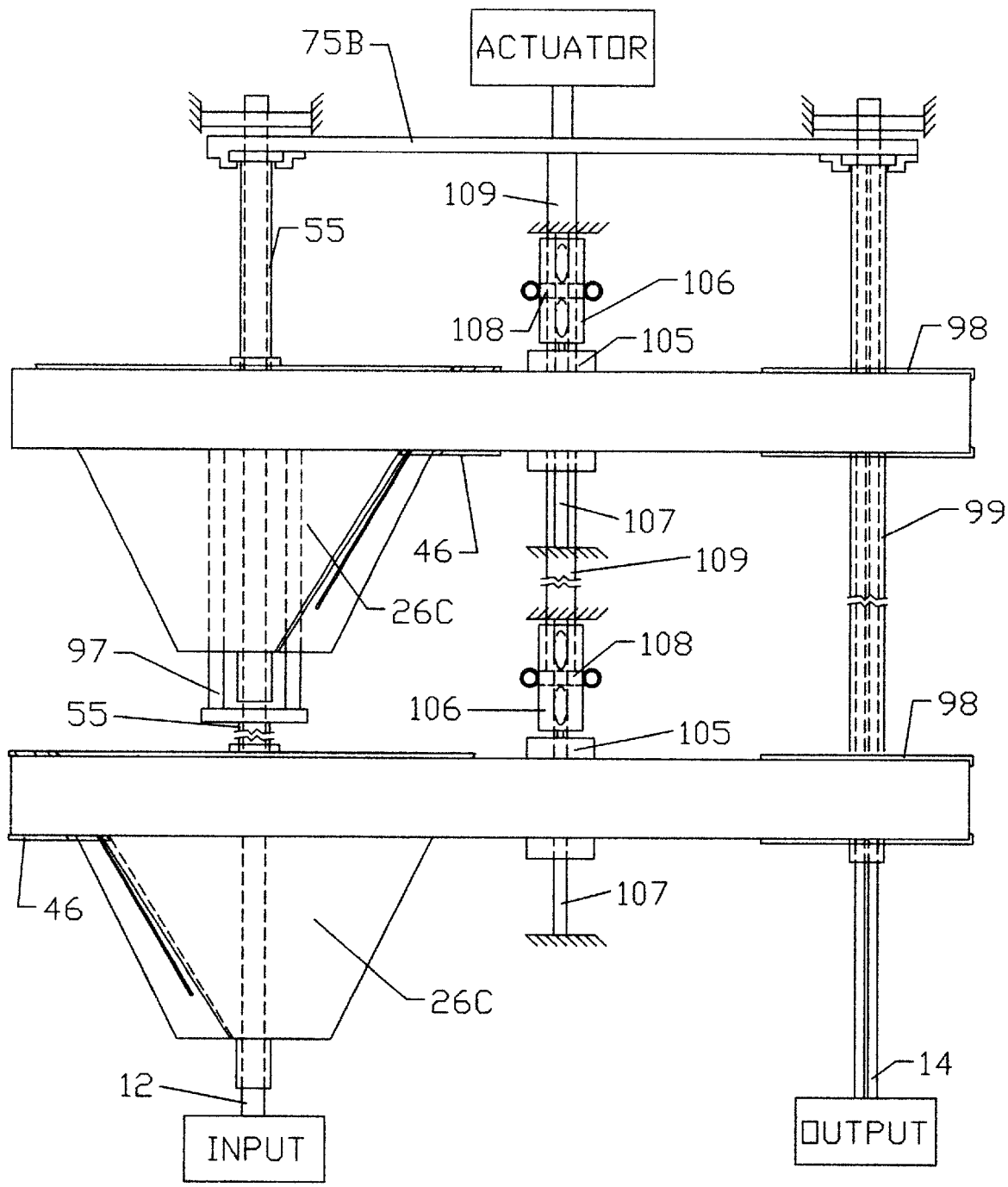

FIG. 6B is a top-view of a CVT that uses two cone assemblies 26C, which are coupled to two transmission pulleys. This CVT will also be labeled as CVT2.

Figure 6D:
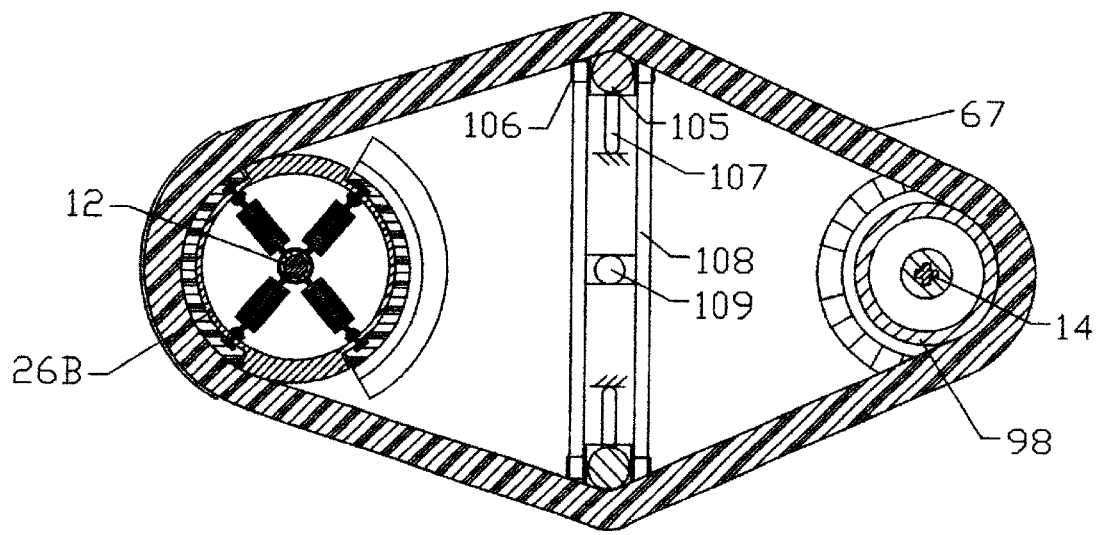
Figure 6C:
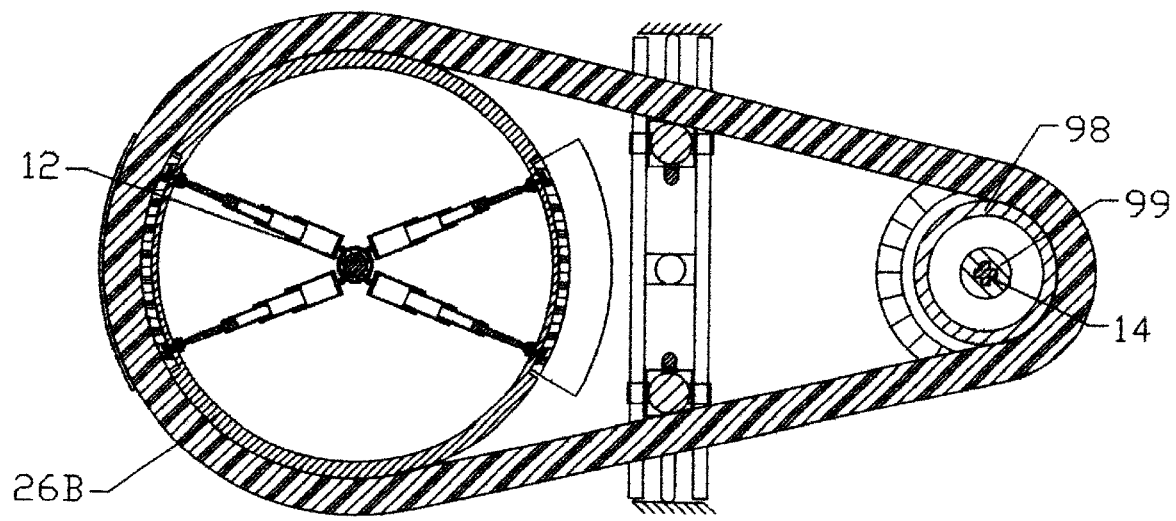

FIG. 6C is a cross-sectional front view of CVT2 taken at the axial midpoint of a torque transmitting member, which is positioned at the larger end of cone assembly 26B.

FIG. 6D is a cross-sectional front view of CVT2 taken at the axial midpoint of a torque transmitting member, which is positioned at the smaller end of cone assembly 26B.

Figure 6E:
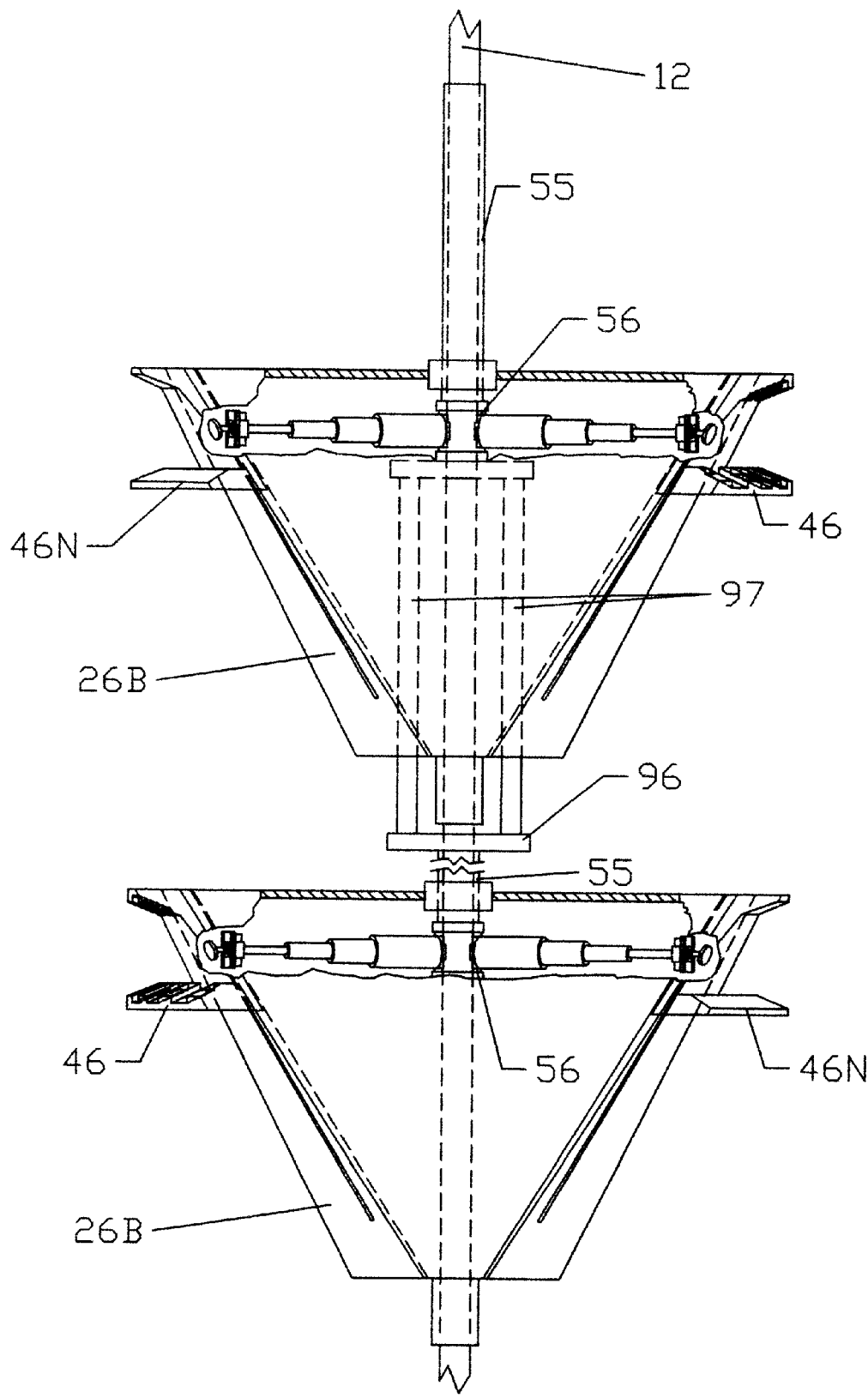

FIG. 6E shows a joiner mechanism that can be used to connect the slider bushings of cone assemblies 26B and cone assemblies 26C.

Reference Numerals in Drawings 12 driver shaft
14 driven shaft
16 shaft
24 cone
24A cone A
24B cone B
24C cone C
26 cone assembly
23A cone assembly A
26B cone assembly B
26C cone assembly C
27 slot
28 non-torque transmitting arc
36 attachment sleeve
37 end cover
38 support sleeve
46 torque transmitting member
46N maintaining member
47 teeth
48 attachment plate
49 attachment wheel Reference Numerals in Drawings (Continued)

55 slider bushing
56 rotor
57 telescope
66 leveling loop
67 transmission belt
75 connector
75B connector B
76 gear rack
77 gear
85 marked wheel
86 marked wheel decoder
96 slider joiner base
97 slider joiner rod
98 transmission pulley
99 spline sleeve
105 tensioning wheel
106 tensioning slider
107 tensioning constrainer
108 tensioning mover
109 tensioning actuator

DESCRIPTION OF INVENTION

Preferred Embodiments

The inventor believes that there is no best method to utilize this invention. Here for some machines one variation, say variation A, works better than say variation B, but the opposite might also be true for some other machines. However, the inventor will clearly identify the advantages of one variation over the other.

First the basic idea of the invention will be presented in the General Cone Assembly section. Then some alternate configuration of the invention, labeled as cone assembly 26A, cone assembly 26B, and cone assembly 26C will be presented. Next, a mover mechanism will be described. Finally, several preferred configurations for a Continuous Variable Transmission (CVT) utilizing the invention will be described.

General Cone Assembly (Cone Assembly 26)—FIGS. 1A, 1B, 1C, 1D

The corner stone of the invention is shown in FIGS. 1A, 1B, 1C, and 1D. It consists of a cone 24, which is keyed to a shaft 16, on which one torque transmitting member 46 is attached as to form a torque transmitting arc, which partially wraps around the surface of cone 24 at an axial section of cone 24. Having the torque transmitting arc formed by a group of torque transmitting members would also work. The torque transmitting arc formed by the torque transmitting member 46 only covers a circumferential portion of cone 24, so that the circumferential portion adjacent to the torque transmitting arc is not covered by the torque transmitting member 46. This circumferential portion is referred to as the non-torque transmitting arc. The torque transmitting arc formed by torque transmitting member 46 will be used for torque transmission between cone 24 and a rotational energy conveying device.

A torque transmitting member 46 is channel shaped, with two sides and a base. Here the bottom surface of the base of the torque transmitting member 46 rests on the surface of cone 24, and a leveling loop 66 rests on the top surface of the base of torque transmitting member 46. The leveling loop 66 is used to provide a level-resting place for a rotational energy conveying device. The inner side surfaces of torque transmitting member 46 have at least one tooth, which will be used for torque transmission between a rotational energy conveying device and cone 24. In this application, the torque transmitting members 46 have a plurality of teeth, which are labeled as teeth 47. It is also possible to have torque transmitting members 46 which side surfaces are not toothed, since friction between the side surfaces of torque transmitting member 46 and the torque transmitting surface(s) of a rotational energy conveying device can also be used to transmit torque. Torque transmitting member 46 is preferably made out of steel reinforced rubber. In order prolong the live of torque transmitting member 46, and reduce the required force to move torque transmitting member 46 to a different axial position relative to the surface of cone 24, the bottom surface of the base of torque transmitting member 46 is PTFE coated. Furthermore, an attachment plate 48 is attached to both ends of torque transmitting member 46. The heads of the attachment plates 48 are preferably molded into the base of torque transmitting member 46. The length of torque transmitting member 46 can be varied according to the need of the CVT where it is utilized.

In order to attach the torque transmitting member 46 to cone 24, cone 24 has two slots 27. Here the attachment plates 48 of torque transmitting member 46 are placed in the slots 27, and secured to cone 24 using an attachment wheel 49. The attachment wheels 49 are aligned so that they roll when torque transmitting member 46 is moved from one axial position of cone 24 to another. Furthermore, the attachment plates 48 can also be used to attach a mover mechanism, which is used to move the torque transmitting member 46 to a new axial position.

The torque transmitting member 46 is attached on cone 24 so that it can only slide in the axial direction of cone 24, which is the direction along the length of shaft 16. Sliding the torque transmitting member 46 in the axial direction changes its pitch diameter, which is the diameter of the surface of cone 24 where the torque transmitting member 46 and the non-torque transmitting arc are positioned. The arc length, and hence the pitch, of the torque transmitting arc, formed by torque transmitting member 46, remains constant regardless of its pitch diameter. The arc length of the non-torque transmitting arc increases as it is being slid from the smaller end of cone 24 to the larger end of cone 24.

Furthermore, in order to prevent a rotational energy conveying device, such as a transmission belt, to deform as it comes in and out of contact with torque transmitting member 46, the surface of cone 24 that will not be covered by torque transmitting member 46, should be made flush with the top surface of the base of torque transmitting member 46. Another method would be to eliminate the base of torque transmitting member 46. This can be achieved by constructing torque transmitting member 46 out of two side members that sit directly on the surface of cone 24, which will be joined beneath the surface of cone 24. Also, in order to reduce vibrations due to the centrifugal force of torque transmitting member 46, cone assembly 26 should be properly balanced.

The cones should be made out of die-cast stainless steel. And in order to obtain better dimensional tolerances and a smoother surface finish the cones obtained from the die-cast process should be machined.

The surface of cone 24 should be PTFE coated. This will reduce the friction between torque transmitting member 46 and the surface of cone 24, which will extend the live of torque transmitting member 46 and reduce the force required to move torque transmitting member 46 to a new axial position. PTFE coating the surface of cone 24 also reduces friction between the surface of cone 24 and the rotational energy conveying device, so that wear due to sliding between the surface of cone 24 and the rotational energy conveying device due to change in pitch diameter is minimized.

Hence a cone assembly 26, which mainly consists of a cone 24 and its torque transmitting member(s) 46, has been introduced.

Cone Assembly 26A—FIGS. 2A, 2B, 2C, & 2D

Cone assembly 26A is a cone assembly 26 with the restriction described in this section. Cone assembly 26A has two torque transmitting arcs, each formed by a torque transmitting member 46 or a group of torque transmitting members 46. The torque transmitting arcs are positioned opposite from each other on the surface of a cone 24A. Furthermore, at the smallest end of cone 24A, each torque transmitting arc covers less than half of the circumferential surface of cone 24A. Like before, a space between the torque transmitting arcs will be referred to as a non-torque transmitting arc.

Cone Assembly 26B—FIGS. 3A, 3B, 3C, & 3D

The only difference between cone assembly 26A and cone assembly 26B is that for cone assembly 26B, one torque transmitting arc, formed by torque transmitting member(s) 46, is replaced with a maintaining arc, formed by one or a group of maintaining member(s) 46N. A maintaining member 46N is identical to a torque transmitting member 46 except that it is not used for torque transmission between a rotational energy conveying device and a cone. The primary function of a maintaining member(s) 46N is to maintain the axial position of a rotational energy conveying device, such as a transmission belt, when it is not in contact with a torque transmitting member 46. Hence the inner side surfaces of maintaining member(s) 46N should not be toothed, and friction between the rotational energy conveying device and maintaining member 46N should be minimized by selecting a proper surface finish and shape for maintaining member 46N. Furthermore, the arc length of the torque transmitting arc is limited such that when the torque transmitting arc is positioned at the smallest end of its cone 24B, the torque transmitting surface(s) of the rotational energy conveying device(s) of the CVT where the cone 24B is used, will never be in contact with the entire non-torque transmitting arc of that cone 24B.

Cone Assembly 26C—FIGS. 4A, 4B, 4C, & 4D

Cone assembly 26C, is a cone assembly 26 with the restriction described in this section. As in cone assembly 26B, the arc length of the torque transmitting arc, formed by torque transmitting member 46, is limited such that when the torque transmitting arc is positioned at the smallest end of its cone 24C, the torque transmitting surface(s) of the rotational energy conveying device(s) of the CVT where the cone assembly 26C is used, will never be in contact with the entire non-torque transmitting arc of that cone 26C. Like before, in order to reduce vibration due to the centrifugal force of torque transmitting member 46, cone assembly 26C should be properly balanced.

Mover Mechanism—FIGS. 3A, 3B, 3C, & 3D

The torque transmitting members 46 and the maintaining members 46N will be moved relative to the surface of the cone on which they are attached using a mover mechanism. The maintaining members 46N are attached to the mover mechanism in the same manner as the torque transmitting members 46, and hence moved in the same manner. For clarity purposes, the maintaining members 46N will not be referred to in this section.

The mover mechanism consists of a slider bushing 55, which is attached to a shaft in a manner such that it tightly fits onto the shaft but is free to slide along the length of the shaft. A rotor 56 is fitted onto slider bushing 55. A locking collar will be used to fix the axial position of rotor 56 relative to slider bushing 55, however rotor 56 is free to rotate on slider bushing 55. In order to attach telescopes 57 to rotor 56, pin-holed plates are attached to the outer surface of rotor 56. The telescopes 57 will be used to connect the torque transmitting member(s) 46 to rotor 56, so that the axial position of the torque transmitting member(s) 46 depend on the axial position of rotor 56. The length of telescopes 57 can vary so that they can connect the torque transmitting member(s) 46 to rotor 56 when the torque transmitting member(s) 46 are positioned at the smallest end and at the largest end of the cone on which they are attached. In instances were only one torque transmitting member 46 is attached to rotor 56, it is recommended that rotor 56 is shaped as to reduce the centrifugal force due to torque transmitting member 46. The bottom end of each telescope 57 has a two pin-holed plates, which will be used to join the bottom end of a telescope 57 to a pin-holed plate on rotor 56 using a locking pin. The top end of each telescope 57 has an attachment plate, which is joined to an attachment plate 48 of a torque transmitting member 46 using a locking pin, on which attachment plate 48 is free to rotated. All parts discussed above are preferably made out of stainless steel, except the slider bushing 55, which is preferably made out of oil-impregnated bronze. The mover mechanism described above can be used to change the axial position of the torque transmitting member(s) 46 and the maintaining member(s) 46N, if any, relative to the surface of cone 24 or cone 24(A/B/C) to which they are attached, by changing the axial position of slider bushing 55 relative to their cone 24 or cone 24(A/B/C).

Continuous Variable Transmission Variation 1 (CVT1)— FIGS. 5A & 5B

CVT1 consists of a pair of cone assemblies 26A, each equipped with a mover mechanism described previously. Here one cone assembly 26A will be keyed to a driver shaft 12 and the other cone assembly 26A will be keyed to a driven shaft 14. Torque between the cone assemblies 26A is transmitted by a transmission belt 67, which couples the torque transmitting members 46 of cone assembly 26A on the driver shaft 12 with the torque transmitting members 46 of cone assembly 26A on the driven shaft 14. As described earlier, the arc length of the torque transmitting arc increases as the torque transmitting members 46 are slid from the smaller end of their cone 24A to the larger end of their cone 24A and vice-versa. Since there are instances were the arc length of the non-torque transmitting arc is not a multiple of the width of teeth 47 some stretching of transmission belt 67 to account for this is to be expected. The transmission ratio depends on the axial position of the torque transmitting members 46 on the surfaces of cones 24A. The torque transmitting members 46 of the cone assemblies 26A should always be properly aligned. In order to achieve this, the slider bushing 55 on the driver shaft 12 and the slider bushing 55 on the driven shaft 14 are rigidly connected by a connector 75. In order to change the transmission ratio, the pitch diameters of the torque transmitting members 46 of the cone assemblies 26A have to be changed. This is achieved by changing the axial position of transmission belt 67 and the torque transmitting members 46 relative to the surfaces of cones 24A using an actuator, which is attached to connector 75.

When for both cone assemblies 26A, transmission belt 67 is not in contact with a complete non-torque transmitting arc then the transmission ratio can be changed without causing significant circumferential sliding between the torque transmitting members 46 and the transmission belt 67. This is because only the arc length of the non-torque transmitting arc changes as the transmission ratio is changed. The configuration where the transmission ratio can be changed without any significant circumferential sliding between the torque transmitting members 46 and transmission belt 67 is referred to as a moveable configuration. And the configuration where changing the transmission ratio will tend to cause significant circumferential sliding between the torque transmitting members 46 and transmission belt 67 is referred to as an unmovable configuration. The actuator should be selected such that changing the transmission ratio when transmission belt 67 is in an unmovable configuration will simply cause the actuator to stall.

One method to eliminate stalling of the actuator, is to equip the actuator with a spring-loaded piston. Here when the transmission belt 67 is in a moveable configuration, than the torque transmitting members 46 will move with the actuator. However, when the transmission belt 67 is not in a moveable configuration then moving the actuator will not move the torque transmitting members 46 but will stretch or compress the spring of the spring-loaded piston of the actuator, until a limit switch on the spring-loaded piston is activated. And once both cone assemblies 26A have rotated so that transmission belt 67 is in a moveable configuration, the tension or compression in the spring-loaded piston will move transmission belt 67 and the torque transmitting members 46 in the direction the actuator was moved until the tension or compression of the spring-loaded piston is relieved.

When transmission belt 67 is in the axial position where the transmission ratio is unity, where the cone assembly 26A on the driver shaft 12 rotates at the same speed as the cone assembly 26A on the driven shaft 14, then transmission belt 67 can get stuck in an unmovable configuration. One method to avoid this problem is to make the smaller end of one cone assembly 26A slightly larger than the larger end of the other cone assembly 26A. Under this configuration the cone assemblies 26A will never rotate at the same speed, so that the rotational position of one cone assembly 26A relative to the other cone assembly 26A continuously changes as the cone assemblies 26A are rotating. Hence eventually the cone assemblies 26A will rotate to a movable configuration.

Another method to avoid having transmission belt 67 stuck in an unmovable configuration is to have a mover control system control the movement of the actuator. Here, every time the actuator is about to move the transmission belt 67 to the position where the transmission ratio between the cone assemblies 26A is unity, the mover control system will stop the actuator. Then the mover control system will wait until the cone assemblies 26A have rotated to a rotational position such that once the actuator moves transmission belt 67 to the axial position where the transmission ratio between the cone assemblies 26A is unity, during the rotation of the cone assemblies 26A an instance were transmission belt 67 is in a movable configuration exists. In order for the mover control system to work, it needs to know the rotational position of each cone assembly 26A, the rotational speed of each cone assembly 26A, the axial position of transmission belt 67, and the speed of the actuator.

In order for the mover control system to determine the rotational position and rotational speed of the cone assemblies 26A, a marked wheel 85 is keyed to the driver shaft 12 and to the driven shaft 14, and each marked wheel 85 has a marked wheel decoder 86,which is attached to the frame of the CVT. In order to accurately determine the axial position of transmission belt 67, a gear rack 76 is attached to the actuator, and a gear 77, which engages the gear rack 76 is attached to the frame of the CVT. A marked wheel 85 is attached to the gear, and a marked wheel decoder 86 decodes the information from this marked wheel 85 to determine the axial position of transmission belt 67.

The information from the wheel decoders 86 mentioned previously, will be transmitted to a computer. The computer will then process the information to properly move the actuator, such that when the transmission belt 67 is moved to the axial position where the transmission ratio is unity, an instance where the CVT is in a moveable configuration exists.

The mover control system can also be designed so that it only moves transmission belt 67 when it is in a moveable configuration, as to prevent the actuator from stalling when it tries to move transmission belt 67 when it is in an unmovable configuration. However, despite the use of a mover control system, stalling of the actuator is still possible. Furthermore, when gear 77 is coupled to a rotary actuator it can be used as the actuator, which controls the axial position of the transmission belt 67 (FIG. 5A).

Continuous Variable Transmission Variation 2 (CVT2)—FIGS. 6A, 6B, 6C, 6D, & 6E

CVT2 consists of either two cone assemblies 26B, which are keyed to a driver shaft 12 such that the torque transmitting member 46 of one cone assembly 26B is positioned opposite from the torque transmitting member 46 of the other cone assembly 26B, or two cones assemblies 26C, which are attached in the same manner. Each cone assembly 26(B/C) is coupled to a transmission pulley 98, attached on driven shaft 14, by a transmission belt 67.

The surfaces of the transmission pulleys 98 are tapered as to match the taper of the outer surfaces of cone assemblies 26(B/C). This allows the transmission belts 67 for this CVT to be shaped such that they can rest on the surface of their respective cone assembly 26(B/C) and on the surface of their respective transmission pulley 98 without being twisted. Hence, there is no need for leveling loop 66 for CVT2. Also, as described earlier, the arc length of the torque transmitting arc increases as the torque transmitting members 46 are slid from the smaller end of their cone 24(B/C) to the larger end of their cone 24(B/C) and vice-versa. Since there are instances were the arc length of the non-torque transmitting arc is not a multiple of the width of the teeth 47 some stretching of transmission belt 67 to account for this is to be expected.

Like in CVT1, the transmission ratio is controlled by controlling the axial position of the torque transmitting members 46 relative to the surface of their respective cone 24(B/C) using the mover mechanism described [in the previous sections] earlier. In order to ensure that the axial position of the torque transmitting members 46 relative to their respective cones 24(B/C) is identical as to ensure that they rotate at the same speed, the slider bushings 55 of the cones assemblies 26(B/C) are rigidly connected by a slider joiner base 96 and slider joiner rods 97 (FIG. 6E). The change in axial position of the torque transmitting members 46 has to be accompanied by the change in axial position of the transmission pulleys 98. In order to achieve this, the transmission pulleys 98 are keyed to a spline sleeve 99 (FIGS. 6A & 6B), which is free to slide along the length of the driven shaft 14 but is not free to rotate relative to driven shaft 14.

Furthermore, the slider bushing 55 of the cone assembly 26(B/C) located closes to the actuator, and the spline sleeve 99 of the transmission pulleys 98 are connected by a connector B 75B in a way such that the torque transmitting members 46 are always properly aligned with their transmission pulleys 98. Also, as in CVT1, the actuator, which is used to change the transmission ratio, should be selected such that changing the transmission ratio when the transmission belts 67 are in an unmovable configuration will simply cause the actuator to stall. Here an unmovable configuration is the configuration were both torque transmitting members 46 are in contact with their transmission belts 67.

Furthermore, in order to maintain proper tension in the transmission belts 67 for every transmission ratio of CVT2, each transmission belt 67 is equipped with a tensioning mechanism. The tensioning mechanism consists of two tensioning wheels 105, two tensioning sliders 106, two tensioning constrainers 107, two tensioning movers 108, and a tensioning actuator 109. The tensioning wheels 105 will be attached so that they touch the base of the transmission belts 67. Each tensioning wheel 105 is attached to a tensioning slider 106. Each tensioning slider 106 slides on a tensioning constrainer 107. The tensioning constrainers 107 are angled so that the tensioning wheels 105 will maintain the proper tension in the transmission belts 67 for every axial position of the transmission belts 67. In order to change the axial position of the tensioning sliders 106, each tensioning slider 106 has two vertical sleeves, which will slide on two vertical guides of a tensioning mover 108 so that the tensioning sliders 106 can freely move vertically as the axial position of tensioning mover 108 is changed. The tensioning actuator 109 connects the tensioning mover 108 closest to connector B 75B to connector B 75B, and connects the tensioning movers 108 such that each tensioning wheel 105 is properly aligned with its torque transmitting member 46 and its transmission pulley 98 for every transmission ratio. Furthermore, tensioning wheels 105 have a smooth non-teethed side surfaces so that they can be used to maintain the alignment of the transmission belts 67, this is especially important if cones 26C are used.

ADVANTAGES

From the description above, a number of advantages of the cone assemblies of this application become evident:

(a) Compared to discrete variable transmissions, the cone assemblies of this application can be used to construct CVTs, which allow a driving source to perform more efficiently, since in most cases a CVT is able to provide a driving source a more efficient transmission ratio than a discrete variable transmission.

(b) Compared to many CVTs of prior art the cone assemblies of this application can be used to construct CVTs for which significant circumferential sliding between the designated torque transmitting surfaces of their cone assemblies and the torque transmitting surface(s) of the rotational energy conveying device(s) engaged with them, which causes wear and frictional energy loses, can be eliminated.

(c) Compared to CVTs of prior art the cone assemblies of this application can be used to construct CVTs for which torque transmission is achieved by the utilization of positive engagement devices, such as teeth.

OPERATION

In order to utilize one or several cone assemblies 26 or 26(A/B/C) of this application, the designer first determines the desired qualities of the CVT the designer wants to built. From there the designer can construct a CVT using one or several cone assemblies 26 or 26(A/B/C) according to the designer's need, by mounting one or several cone assemblies 26 or 26(A/B/C) to a first shaft and coupling them, directly or by the use of a rotational energy conveying device such as a transmission belt, with one or several rotational energy conveying devices, including but not limited to pulleys, other cone assemblies, or sprockets, mounted on a second shaft in a manner such that for all axial positions of the torque transmitting arc(s) at least a portion of a torque transmitting arc, formed by torque transmitting member(s) 46, of at least one cone assembly 26 or 26(A/B/C) mounted on the first shaft is always properly coupled to a torque transmitting surface or member of a rotational energy conveying device mounted on the second shaft. Also, the designer needs to ensure that changing the axial position of the torque transmitting member(s) relative to their cone 24 or 24(A/B/C) changes the transmission ratio of the CVT.

In addition, the designer also needs to ensure that for the CVT that the designer has designed, for every transmission ratio of the CVT, an instance exist where the transmission ratio can be changed without any significant circumferential sliding between the torque transmitting surfaces of the torque transmitting member(s) 46 and the torque transmitting surfaces(s) of the rotational energy conveying device(s) engaged with them. This can easily be done through experimentation.

Once a CVT out of one or several cone assemblies 26 or 26(A/B/C) has been constructed, such as CVT1 and CVT2, the designer first couples the driving source to the input shaft 12 of the CVT and couples the member to be driven to the output shaft 14 of the CVT. The input and output shafts can be reversed if necessary. Next, in order to change the transmission ratio, the operator uses an actuator, which changes the axial position of the torque transmitting member(s) 46 and the rotational energy conveying device(s) directly or indirectly engaged to them relative to the surface of the cones 24 or 24(A/B/C), when their axial positions can be changed without causing any significant circumferential sliding between the torque transmitting surfaces of the torque transmitting member(s) and the torque transmitting surfaces(s) of the rotational energy conveying device(s) engaged with them.

CONCLUSION, RAMIFICATION, AND SCOPE

Accordingly the reader will see that the cone assemblies of this application can be used to construct various Continuous Variable Transmissions (CVTs), which have the following advantages over existing Variable Transmissions:

Compared to Discrete Variable Transmissions, they are able to provide a more efficient transmission ratio for a driving source under most circumstances due to their infinite transmission ratios over a predetermined range.

They can be constructed such that torque between the torque transmitting members of their cone(s) and the rotational energy conveying device(s) engaged to them is transmitted using positive engagement devices, such as teeth. Hence they can provide torque transmission ability and efficiency almost as good as transmissions utilizing gears, sprocket and chains, and timing belts and timing pulleys, which have not yet been effectively used to construct CVTs. Gears, and sprocket and chains are currently almost used in any high torque transmission application due to their superior torque transmission ability and efficiency over any other transmission devices. Hence the CVTs constructed out of the cone assemblies of this application will most likely have higher torque transmission ability and efficiency than many CVTs of prior art.

They have a longer live and less frictional energy losses than many CVTs of prior art, since significant circumferential sliding between the designated torque transmitting surfaces can be eliminated.

Although the description above contains many specificities, these should not be construed as limiting the scope of the invention but as merely providing illustrations of some of the presently preferred embodiments of this invention. For example, a CVT can be constructed out of one cone assembly 26A described above coupled to a timing pulley. Under this configuration only one cone assembly 26A is needed, and here the transmission belt 67 will never get stuck in an unmovable configuration, hence the mover control system of CVT1 is not needed in this design.

Furthermore by using a cone assembly 26D, which is identical to a cone assembly 26 described in the general cone section, except for having a torque transmitting member 46 with a square cross section instead of a channel shaped one, such that it can be coupled to a gear, one or several cone assemblies 26D on a driver shaft can be coupled to one or several gears on one or several driven shafts and vice-versa. For example, if the arc length of the torque transmitting member 46 at the largest end of its cone assembly 26D is not less than half of the circumference of cone assembly 26D, than a CVT can be constructed where two gears, which are attached so that they can engage with the teeth 47 of the torque transmitting member 46, are positioned as to sandwich a cone assembly 26D. Also a CVT, which consist of several cone assemblies 26D, which engage directly with each other can also be designed. Furthermore, for CVT1 and CVT2, the transmission belt can be replaced with a flexible chain. A torque transmitting member 46 that can engage with a flexible chain can also be designed. Given the time and need, a workable model for the designs mentioned in this paragraph as well as many other designs could be conceived. Here the concept of the cone with torque transmitting members might be treated like a gear, since for both devices many workable arrangements, based on the need and constraints of the designer, are possible.

Thus the scope of the invention should be determined by the appended claims and their legal equivalents, rather than by the examples given.

I claim:

1. A cone assembly for a continuous variable transmission, comprising:
    a) a cone rotatably attached to a shaft along an axis of rotation,
    b) a torque transmitting member or group of torque transmitting members, which at an axial section of said cone partially wrap around the surface of said cone so as to form a torque transmitting arc, said torque transmitting member(s) are used for torque transmission between one or several means for conveying rotational energy and said cone assembly,
    said torque transmitting member(s) are rotatably fixed relative to said cone, but are allowed to slide relative to said cone in the axial direction of said cone,
    sliding of said torque transmitting member(s) in said axial direction changes the pitch diameter of said torque transmitting member(s), which is the diameter of the surface of said cone that coincides with the diameter of said torque transmitting arc at each specific location along the surface of said cone,
    the arc length of said torque transmitting arc, formed by said torque transmitting member(s), remains constant as said pitch diameter changes.

2. The cone assembly of claim 1 wherein positive engagement devices are used for torque transmission between said torque transmitting member(s) and said means for conveying rotational energy.

3. The cone assembly of claim 1 wherein said torque transmitting member(s) have a cross-section that is channel shaped with two sides and a base.

4. The cone assembly of claim 3 wherein said sides of said torque transmitting member(s) have inner surfaces that are toothed.

5. The cone assembly of claim 3 wherein a leveling loop is placed between said sides of said torque transmitting member(s).

6. A continuous variable transmission, comprising:
a) two shafts,
b) at least two means for coupling a torque transmitting member or a group of torque transmitting members of at least one cone assembly with at least two means for conveying rotational energy,
c) at least two said means for conveying rotational energy, which have a fixed pitch diameter respectively, are placed on one of said shaft, so that torque is transmitted from said means for conveying rotational energy to said shaft,
d) two said cone assemblies, where each said cone assembly comprises of a cone and one said torque transmitting member or one group of said torque transmitting members, which at an axial section of said cone partially wrap around the surface of said cone so as to form a torque transmitting arc,
   for each said cone assembly, sliding of said torque transmitting member(s) relative to said cone in an axial direction changes the pitch diameter of said torque transmitting member(s), which is the diameter of the surface of said cone that coincides with the diameter of said torque transmitting arc at each specific location along the surface of said cone,
   the arc length of said torque transmitting arc, formed by said torque transmitting member(s), remains constant as said pitch diameter changes,
   the arc length of said torque transmitting arcs, formed by said torque transmitting members, are limited such that for every axial position of said torque transmitting members relative to their said cones, the radial sections of said cones adjacent to said torque transmitting arcs, which are not covered by said torque transmitting member(s), are never completely covered by their said means for coupling for every rotational position of said cones,
   said cone assemblies are placed on the other of said shaft so that said torque transmitting arc, formed by said torque transmitting member(s), of one of said cone assembly is opposite from said torque transmitting arc of the other of said cone assembly, and the apexes of both said cone assemblies point in the same direction, said cone assemblies are placed on the other of said shaft such that torque from said cone assemblies is transmitted to said shaft on which said cone assemblies are placed,
e) means for slideably attaching said means for conveying rotational energy or said cone assemblies to a respective one of said shaft, is attached to one said shaft, as to allow the axial position of said means for conveying rotational energy to be changed relative to the axial position of said cones,
f) means for changing the transmission ratio, which changes the axial position of said torque transmitting members, said means for coupling, and said means for conveying rotational energy relative to the axial positions of said cones, when the axial position of said torque transmitting members, said means for coupling, and said means for conveying rotational energy can be changed relative to the axial positions of said cones without any significant circumferential sliding between said torque transmitting member(s) and said means for coupling, such that said torque transmitting members are always properly aligned with their said means for coupling and their said means for conveying rotational energy,
g) means for maintaining tension in said means for coupling for every transmission ratio of said continuous variable transmission.

7. The continuous variable transmission of claim 6 wherein said torque transmitting members are engaged with their said means for coupling using positive engagement devices.

8. The continuous variable transmission of claim 6 wherein a maintaining member or a group of maintaining members, are attached opposite of said torque transmitting arc, formed by said torque transmitting member(s), on the surface of said cones.

9. The continuous variable transmission of claim 6 wherein said torque transmitting members have a cross section that is channel shaped with two sides and a base.

10. The continuous variable transmission of claim 9 wherein said sides of said torque transmitting members have inner surfaces that are toothed.

11. The continuous variable transmission of claim 10 wherein a maintaining member or a group of maintaining members, are attached opposite of said torque transmitting arc, formed by said torque transmitting member(s), on the surface of said cones.

12. A cone assembly for a continuous variable transmission, comprising:
a) a cone rotatably attached to a shaft along an axis of rotation,
b) two torque transmitting members or two groups of said torque transmitting members, each forming a torque transmitting arc on the surface of said cone, said torque transmitting arcs, are attached opposite from each other on the surface of said cone, said transmitting members are used for torque transmission between one or several means for conveying rotational energy and said cone assembly,
   said torque transmitting members are rotatably fixed relative to said cone, but are allowed to slide axially relative to said cone, changing the axial position of said torque transmitting members relative to the axial position of said cone changes the pitch diameter of said torque transmitting members, which is the diameter of the surface of said cone that coincides with the diameter of said torque transmitting arcs at each specific location long the surface of said cone,
   the arc lengths of said torque transmitting arcs remain constant as said pitch diameter changes.

13. The cone assembly of claim 12 wherein positive engagement devices are used for torque transmission between said torque transmitting members and said means for conveying rotational energy.

14. The cone assembly of claim 12 wherein said torque transmitting members have a cross-section that is channel shaped with two sides and a base.

15. The cone assembly of claim 14 wherein said sides of said torque transmitting members have inner surfaces that are toothed.

16. The cone assembly of claim 15 wherein a leveling loop is placed between said sides of said torque transmitting members.

17. A continuous variable transmission, comprising:
a) two shafts,
b) two cone assemblies each attached to one of said shaft such that the apex of one of said cone assembly is opposite from the apex of the other said cone assembly, each said cone assembly comprises of a cone and two torque transmitting members or two groups of said torque transmitting members, each forming a torque transmitting arc at an axial position on the surface of said cone, said torque transmitting arcs, on the surface of a respective said cone, are placed spaced apart opposite from each other on the surface of said cone, the spaces between the ends of said torque transmitting arcs, which are not covered by said torque transmitting members, are considered as non-torque transmitting arcs, said torque transmitting members are rotatably fixed relative to their said cone, but are able to slide axially relative to their said cone, for each said cone assembly, changing the axial position of said torque transmitting members relative to the axial position of their said cone changes the pitch diameter of said torque transmitting members, which is the diameter of the surface of said cone that coincides with the diameter of said torque transmitting arcs at each specific location along the surface of said cone, the arc lengths of said torque transmitting arcs, formed by said torque transmitting members, remain constant as said pitch diameter changes, but the arc lengths of said non-torque transmitting arcs change as said pitch diameter changes, c) means for coupling said torque transmitting members of one of said cone assembly with said torque transmitting members of other the said cone assembly, said means for coupling is used for torque transmission between said cone assemblies, d) means for changing the transmission ratio of said continuous variable transmission, which changes the axial position of said torque transmitting members and said means for coupling relative to the axial position of said cones, if changing the axial position of said torque transmitting members and said means for coupling relative to the axial position of said cones will not cause significant circumferential sliding between said torque transmitting members and said means for coupling, such that said torque transmitting members and said means for coupling are always properly aligned, e) means for preventing said means for coupling from getting stuck in an unmovable position, which is a position for which for at least one said cone assembly, said means for coupling is in contact with an entire said non-torque transmitting arc.

18. The continuous variable transmission of claim 17 wherein said torque transmitting members are engaged with said means for coupling using positive engagement devices.

19. The continuous variable transmission of claim 17 wherein said torque transmitting members have a cross section that is channel shaped with two sides and a base.

20. The continuous variable transmission of claim 19 wherein said sides of said torque transmitting members have inner surfaces that are toothed.

21. The continuous variable transmission of claim 20 wherein a leveling loop is placed between said sides of said torque transmitting members.

22. A method for constructing a continuous variable transmission, comprising the steps of:

a) attaching at least one cone assembly to a first shaft, where each said cone assembly comprises of a cone to which at least one torque transmitting member is attached as to form one or several torque transmitting arc(s) on the surface of said cone at an axial section of said cone, said torque transmitting member(s), which are used for torque transmission, are rotatably fixed relative to their said cone, but are able to slide axially relative to their said cone, for each said cone assembly, changing the axial position of said torque transmitting member(s) relative to the axial position of their said cone changes the pitch diameter of said torque transmitting member(s), which is the diameter of the surface of said cone that coincides with diameter of said torque transmitting arcs at each specific location along the surface of said cone, the arc lengths of said torque transmitting arc(s), formed by said torque transmitting member(s), remain constant as said pitch diameter changes, b) attaching one or several means for conveying rotational energy, of fixed or variable pitch diameter, on a second shaft, which include said cone assemblies, said means for conveying rotational energy have at least one means for transmitting torque, which is used for torque transmission, c) coupling said torque transmitting member(s) of each said cone assembly on said first shaft with said means for transmitting torque of at least one said means for conveying rotational energy on said second shaft, directly or by using a means for coupling, where, changing the axial position of said torque transmitting member(s), their said means for transmitting torque, and their said means for coupling relative to the axial position of their said cone(s), changes the transmission ratio of said continuous variable transmission.

* * * * *